No. 862,895. PATENTED AUG. 13, 1907.
J. R. FORDYCE.
TROLLEY FOR CARRYING BALES OF COTTON.
APPLICATION FILED NOV. 21, 1906.
2 SHEETS—SHEET 1.
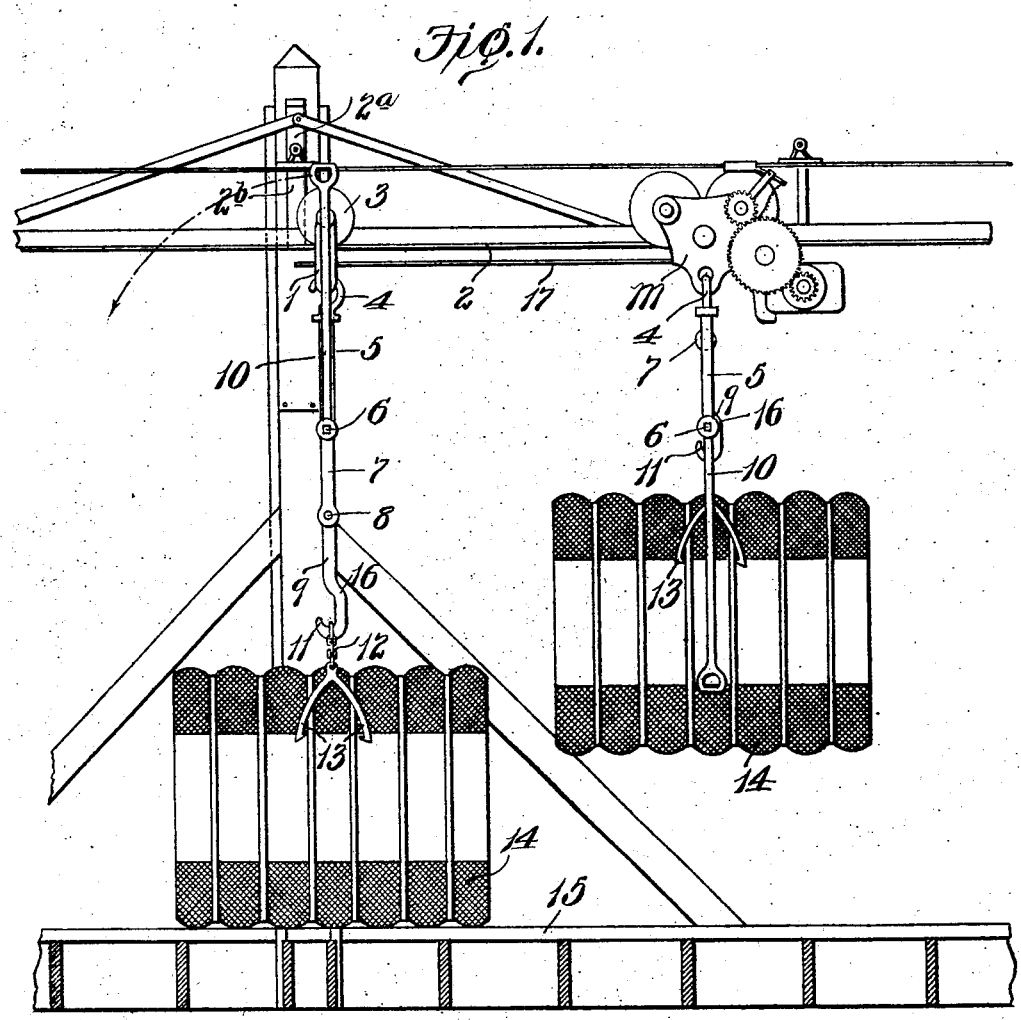
Witnesses:
Edgar T. Farmer
Wells L. Church
Inventor,
John R. Fordyce.
By Bakewell & Cornwall
attys.

No. 862,895. PATENTED AUG. 13, 1907.
J. R. FORDYCE.
TROLLEY FOR CARRYING BALES OF COTTON.
APPLICATION FILED NOV. 21, 1906.
2 SHEETS—SHEET 2.
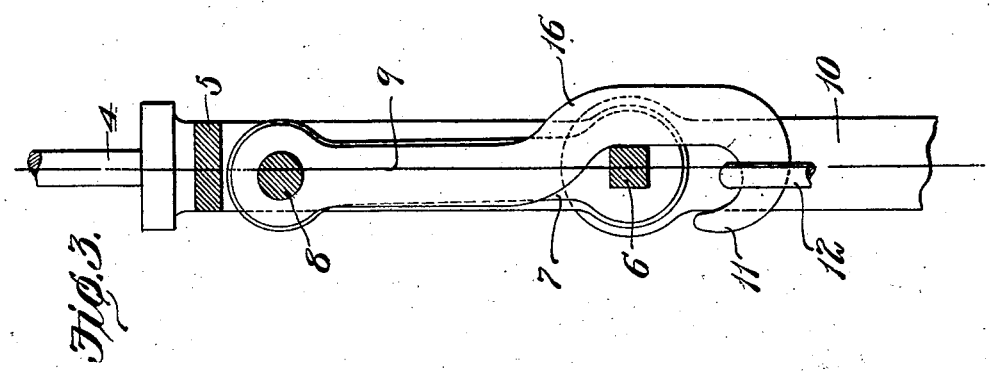
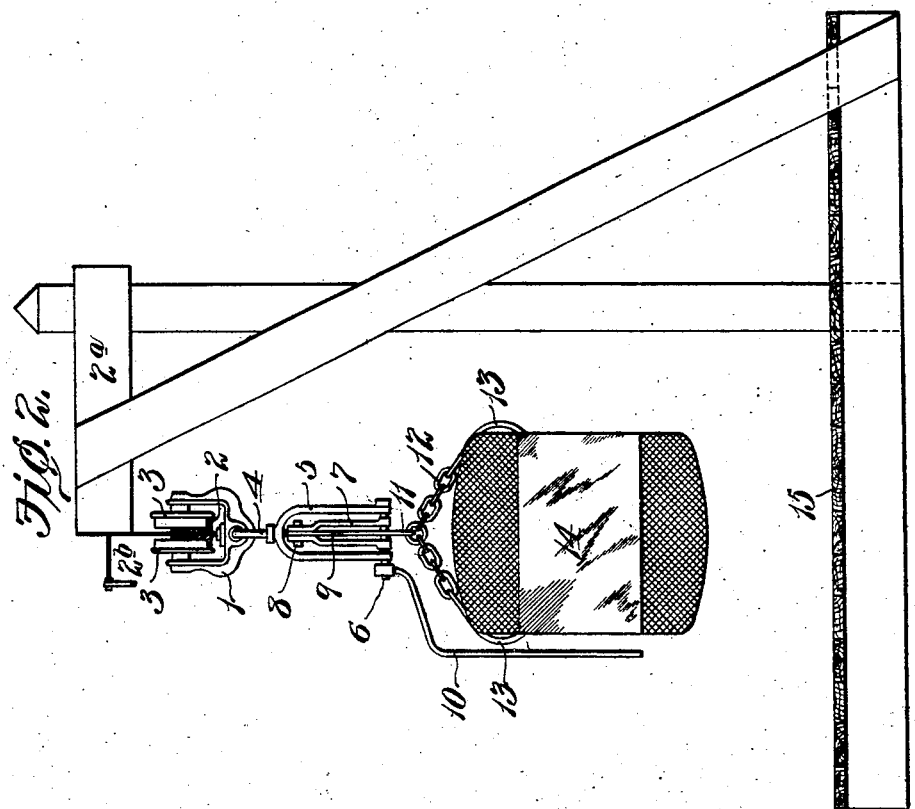
Witnesses:
Edgar J. Farmer
Wells L. Church
Inventor;
John R. Fordyce.
By Bakewell Cornwall
attys.

UNITED STATES PATENT OFFICE.

JOHN R. FORDYCE, OF LITTLE ROCK, ARKANSAS.

TROLLEY FOR CARRYING BALES OF COTTON.

No. 862,895.

Specification of Letters Patent.

Patented Aug. 13, 1907.

Application filed November 21, 1906. Serial No. 344,443.

*To all whom it may concern:*

Be it known that I, JOHN R. FORDYCE, a citizen of the United States, residing at Little Rock, Arkansas, have invented a certain new and useful Improvement in Trolleys for Carrying Bales of Cotton, of which the following is a full, clear, and exact description, such as will enable others skilled in the art to which it appertains to make and use the same, reference being had to the accompanying drawings, forming part of this specification, in which—

Figure 1 is a view in side elevation showing trolleys constructed in accordance with my invention in operative position on a track; Fig. 2 is a view in end elevation of one of the trolleys shown in Fig. 1; and Fig. 3 is an enlarged detail view of the lifting means with which the trolley is provided.

This invention relates to devices for handling bales of cotton.

The object of my invention is to provide a trolley or conveyer adapted to run on a track and having means for raising a bale of cotton from a platform or floor and holding it elevated.

Referring to the drawings which represent the preferred form of my invention, 1 designates the frame of the conveyer or trolley which is substantially U-shape, as shown in Fig. 2. The trolley herein shown is designed to run on a track 2 of inverted T form and accordingly, is provided with two flanged wheels or rollers 3 that travel on the horizontally disposed flanges of the track, said wheels being mounted on shafts that are carried by the upwardly projecting arms of the U-shaped frame 1. The portion of the frame 1 which connects the two upwardly projecting arms thereof is located beneath the track on which the conveyer travels and is provided with an eye or opening for receiving a hook 4 on the closed end of a yoke-shaped member 5, shown clearly in Fig. 2.

A shaft 6 is journaled in the downwardly extending side-pieces of the yoke 5 and rigidly connected to said shaft between the side-pieces of the yoke are two arms 7 provided at their outer ends with a cross-pin 8 on which a link 9 is mounted. A lever or handle 10 is secured to the outer end of the shaft 6 and projects therefrom in the opposite direction to the arms 7, said lever being bent laterally and then downwardly, as shown in Fig. 2, so as not to come in contact with the bale of cotton which the trolley carries. The link 9 is provided at its lower end with a hook 11 on which the chain 12 connecting the cotton hooks 13 can be placed when said link is in its lowered position, shown at the left of Fig. 1, the operating lever 10 at such times projecting upwardly. To raise the bale 14 from the floor or platform 15 the lever 10 is pulled downwardly in the direction indicated by the arrow in Fig. 1, thereby causing the shaft 6 to rotate and thus move the arms 7 into their upwardly projecting position shown in Fig. 3. As the link 9 is connected to the outer ends of said arms it will, of course, be elevated and thereby raise the bale of cotton from the platform into the position shown in Fig. 2. The lower end of the link 9 is offset at 16, as shown in Fig. 3, to permit the upper ends of the arms 7 to move forwardly far enough to carry the cross-pin 8 on which the link is mounted, beyond the vertical plane in which the shaft lies and as said link is longer than the arms 7 the lower portion of said link will bear against the shaft 6 and thus retain the arms 7 in their elevated position so as to hold the bale suspended above the platform.

Any suitable means may be employed for propelling the trolley and if desired several trolleys constituting trailers can be coupled to a motor M by a bar 17, as shown in Fig. 1, said motor also being provided with mechanism of the construction previously described for raising a bale and holding it elevated.

From the foregoing description it will be seen that I have provided a trolley or conveyer having a lifting device of very simple construction and capable of being operated quickly and with the expenditure of very little energy.

The track herein shown also forms one of the novel features of my invention as it can be constructed cheaply from two angles placed together to form an inverted T and suspended from a support or arm 2ᵃ by means of a strap or bar of iron 2ᵇ interposed between the vertical legs of the angles.

Having thus described my invention, what I claim as new and desire to secure by Letters Patent is:

1. A trolley or conveyer consisting of a frame provided with rollers that are adapted to travel on a track, a shaft supported by said frame and provided with an arm to which the article that is to be carried is connected, a supporting link of greater length than said arm and pivotally connected to the outer end of said arm, and a lever fastened to said shaft to turn it for moving the arm into an elevated position, said link being provided at its lower end with an offset to receive the shaft so that when the arm is in its elevated position the upper end of the link will be located beyond the vertical plane in which the shaft lies; substantially as described.

2. A trolley or conveyer consisting of a frame provided with wheels, a yoke-shaped member depending from said frame and having a shaft journaled in the lower ends of its side pieces, a plurality of arms rigidly connected to said shaft between said side pieces, a supporting link mounted on a cross-pin extending through the outer ends of said arms, said link being longer than said arms and offset adjacent its lower end to receive the shaft so that when the arms are in their elevated position the cross-pins in the upper end of the link will be located to one side of the vertical plane in which the shaft lies, and a lever connected to said shaft for turning it to move said arms into an elevated position; substantially as described.

3. A trolley or conveyer consisting of a U-shaped frame having rollers journaled in the upwardly projecting arms thereof, the cross-piece of said frame being located beneath the track on which the rollers of the trolley travel, a yoke-shaped member provided at its closed end with a hook that is adapted to engage the cross-piece of said frame, a shaft journaled on said yoke-shaped member and provided with an arm to which the article that is to be carried is fastened, and a device for turning said shaft to move said arm into an elevated position; substantially as described.

In testimony whereof I hereunto affix my signature in the presence of two witnesses, this 30 day of October 1906.

JOHN R. FORDYCE.

Witnesses:
COLUMBUS BIERCE,
A. .G. CRAWFORD.